Patented Sept. 16, 1930

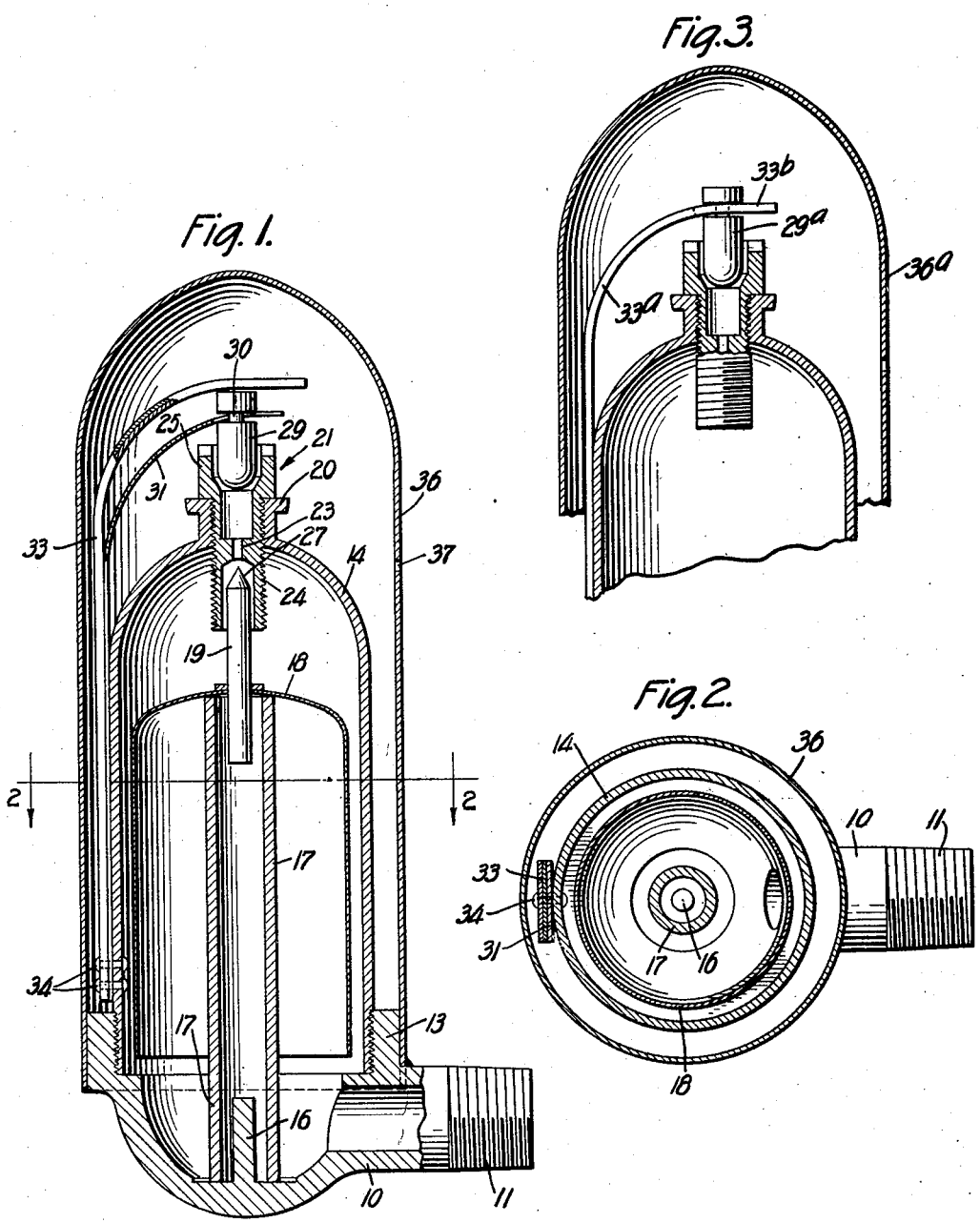

1,775,637

UNITED STATES PATENT OFFICE

GEORGE D. CHADEAYNE, OF BROOKLYN, NEW YORK

RELIEF VALVE OR TRAP

Application filed May 13, 1929. Serial No. 362,651.

My present invention relates to improvements in relief valves or traps and may be considered as an improvement in the form of valve construction shown in my prior Patent No. 1,598,242, dated August 31, 1926. In that patent I disclosed a form of valve in which a thermostatic element was employed for actuating the valve proper, this element having a non-positive connection with the valve proper such that the thermostatic element was operative to close the valve when hot but inoperative to close same when cold, provision also being made for a separate spring element to open the valve when the pressure within the system was substantially atmospheric. It is the principal object of the present invention to arrange the elements of said prior construction so as to provide for a float actuated valve member for the purpose of preventing escape of water or other liquid in the system to which my valve may be applied; and to provide a construction in which the thermostatic element employed will be disposed so that it may function most efficiently, i. e. by having proper thermal contact with the steam or vapor while at the same time being protected against undue loss of heat by radiation and convection, this latter feature being applicable to valves of other types. Other objects and advantages of my invention will be apparent as the description proceeds and the novel features will be pointed out in the appended claims.

In the drawings forming part of this specification:

Figure 1 is a view in central longitudinal section of an illustrative embodiment, the scale of the drawing being enlarged;

Figure 2 is a view taken in section along the line 2—2 of Figure 1; and

Figure 3 is a view showing a modification.

Referring to the drawings by characters of reference, 10 denotes the base of the valve having portion 11 forming a conduit and having an exterior screw thread as shown, for attachment to a radiator or other device. The inside of the upstanding rim 13 of base 10 is threaded so as to receive an inner shell 14 constituting a float chamber. Base 10 also has an upstanding lug or pin 16 receiving a stem 17 to which a preferably open-ended float 18 is attached by means of an axially disposed pin 19 secured thereto and depending within said float chamber and, when the parts are assembled, within the stem 17.

Shell 14 terminates in an annular axially disposed threaded portion 20 which is adapted to receive a valve seat block 21. The latter has a bored passage 23 together with a sleeve portion 24 which depends into the shell 14 and cooperates with passage 23 to form a valve seat. Block 21 has an upward opening recess 25 forming a second valve seat. Pin 19 attached to float 18 has preferably a tapered end 27 which is adapted to seat partially within the bore 23 thereby to close said bore when moved upwardly against same as by the presence of liquid in the float chamber. Cooperating with valve seat 25 is a second valve pin 29 having preferably a recessed or annular slotted portion 30 within which is adapted to engage the forked end of a spring 31 arranged so as to compensate for the weight of such stem.

For the purpose of operating the valve pin 29, a thermostatic element 33 is provided which in the preferred embodiment is attached to the exterior of shell 14 by means of rivets 34 and, if desired, by solder as well, said member 33 extending upward and over the valve member 29 but having a non-positive connection therewith as shown. Also joined to shell 14, preferably with the thermostatic element 33 is the end of spring 31 as shown.

In order to afford the proper heating and cooling conditions for thermostatic element 33 as well as to protect same against accidental disturbance and from dust, an outer shell 36 is provided which preferably fits over the rim 13 of base 10 and encloses the valve parts and thermostatic element as shown. It may be secured to the base 10 in any suitable way, as by soldering. Shell 36 is provided with a vent 37 and imparts to the valve a neat and attractive appearance.

In the operation of my device, air may be vented from the system through the passage 23 and the vent hole 37 both valves being open. When, however, steam starts to flow through the valve, the thermostatic element 33 will be heated up and its action will be to close valve pin 29 upon its seat 25 and thus prevent further egress of steam. However; when the heating system is allowed to cool off and a vacuum produced therein, this vacuum will be held (assuming the system without substantial leakage) by the action of the valve pin 29 remaining on its seat. When, however, for any reason the vacuum is destroyed then the spring 31 will be effected to lift valve pin 29 away from its seat and the valve will then be ready for venting air from the system when the steam is again being generated. At the same time should the system fill with water as by leakage or by inadvertently omitting to turn off the supply of make-up water to the system, the valve pin 19 will be urged upon its seat by the action of the float 18 and thus prevent egress of water thru the valve.

In Figure 3 I have illustrated a construction in which the non-positive connection of the thermostatic element 33ª is replaced by a positive connection therewith by virtue of a fork 33ᵇ in said element engaging a recess in the valve pin 29ª, this construction corresponding to the ordinary non-vacuum radiator air valve. Due, however, to the outer shell 36ª the efficiency of operation of said valve will be increased.

It will be noted that in the forms of construction shown, the thermostatic elements 33 and 33ᵇ may be arranged to act as a safety device for the reason that beyond a certain temperature the pressure of steam, for example, within the system will be greater than the force exerted by the thermostatic element in the direction to keep the valve shut. Accordingly, by suitably proportioning the size of the thermostatic element and that of the valve seat, my improved device may be arranged to function as a safety valve for any temperature and pressure over a comparatively wide range.

I claim:

1. In a relief valve, a valve proper, a second valve controlled by temperature, an inner shell constituting a float chamber, a float therein, an outer heat insulating and protecting shell over said shell first mentioned, and a thermostatic element in the annular space between said shells for controlling said temperature controlled valve, said element being attached to the exterior of said inner shell.

2. In a relief valve having a valve proper which is controlled by a thermostatic element having a nonpositive connection therewith such that said element when hot is operative to close said valve but is inoperative to open same when cold together with a spring element attached to hold said valve open when the pressure on either side of said valve is substantially equal, an inner shell constituting a float chamber, a float therein, an outer heat insulating and protecting shell over said inner shell and forming an annular space between it and said inner shell, said thermostatic element being attached to the exterior of said inner shell and being contained within said annular space.

3. In a relief valve of the type described, a shell constituting a float chamber, a float in said chamber, a valve pin carried thereby, a second valve pin, a thermostatic element for actuating same, the latter being attached to said shell and a valve block carried by said shell first mentioned and having a passage therethrough, said block providing a valve seat for said float controlled valve and a seat for said temperature controlled valve.

4. In a relief valve having a valve proper which is controlled by a thermostatic element having a non-positive connection therewith such that said element when hot is operative to close said valve but is inoperative to open same when cold, together with a spring element adapted to open said valve when the pressure of either side thereof is substantially equal, a shell constituting a float chamber, a float therein, said shell having attached to the exterior thereof said thermostatic element and said spring element.

In testimony whereof I have affixed my signature to this specification,

GEO. D. CHADEAYNE.